(12) United States Patent
Young et al.

(10) Patent No.: US 10,409,662 B1
(45) Date of Patent: Sep. 10, 2019

(54) AUTOMATED ANOMALY DETECTION

(71) Applicant: Amazon Technologies, Inc., Reno, NV (US)

(72) Inventors: Lawrence Shao-Shien Young, Mercer Island, WA (US); Pratheek Benamanahalli Nagaraj, Coral Springs, FL (US)

(73) Assignee: Amazon Technologies, Inc., Reno, NV (US)

( * ) Notice: Subject to any disclaimer, the term of this patent is extended or adjusted under 35 U.S.C. 154(b) by 177 days.

(21) Appl. No.: 14/072,589

(22) Filed: Nov. 5, 2013

(51) Int. Cl.
*G06F 11/00* (2006.01)
*G06F 11/07* (2006.01)

(52) U.S. Cl.
CPC .................. *G06F 11/0754* (2013.01)

(58) Field of Classification Search
CPC ............... G06F 11/079; G06F 11/0709; G06F 11/0793; G06F 11/0751; G06F 11/30; G06F 11/3072; G06F 11/3495; G06F 11/3664; G06F 11/00; G06F 11/0736; G06F 11/0754; G06F 11/22–277; G06F 11/36–3696; H04L 41/0631; H04L 41/0677
See application file for complete search history.

(56) References Cited

U.S. PATENT DOCUMENTS

| | | | | |
|---|---|---|---|---|
| 9,690,645 | B2 * | 6/2017 | Samuni | G06F 11/079 |
| 2005/0015667 | A1 * | 1/2005 | Aaron | G06F 11/0709 714/25 |
| 2006/0020923 | A1 * | 1/2006 | Lo | G06F 11/0709 717/127 |
| 2011/0087924 | A1 * | 4/2011 | Kandula | G06F 11/0709 714/26 |
| 2011/0239051 | A1 * | 9/2011 | Basu | G06F 11/079 714/37 |

* cited by examiner

*Primary Examiner* — Jason B Bryan
(74) *Attorney, Agent, or Firm* — BakerHostetler

(57) ABSTRACT

Disclosed are techniques for determining possible causes of anomalous state in computing nodes. A computing node is analyzed for a given time period against another computing node over another time period. Individual metrics such as network bandwidth are measured and a subset of these metrics that are determined to be most likely related to the cause of anomalous state are provided to a user.

24 Claims, 7 Drawing Sheets

AUTOMATED ANOMALY DETECTION

BACKGROUND

In datacenters, computing nodes (such as virtual machine instances, physical computers, and network routing hardware) may sometimes be in an impaired, or anomalous, condition. There are many metrics that may be analyzed to determine a possible cause of a computing node being in an impaired condition, or an action to implement to possibly remediate the computing node from being in the impaired condition.

BRIEF DESCRIPTION OF DRAWINGS

Throughout the drawings, reference numbers may be re-used to indicate correspondence between referenced elements. The drawings are provided to illustrate example embodiments described herein and are not intended to limit the scope of the disclosure.

DETAILED DESCRIPTION

Figure 1:
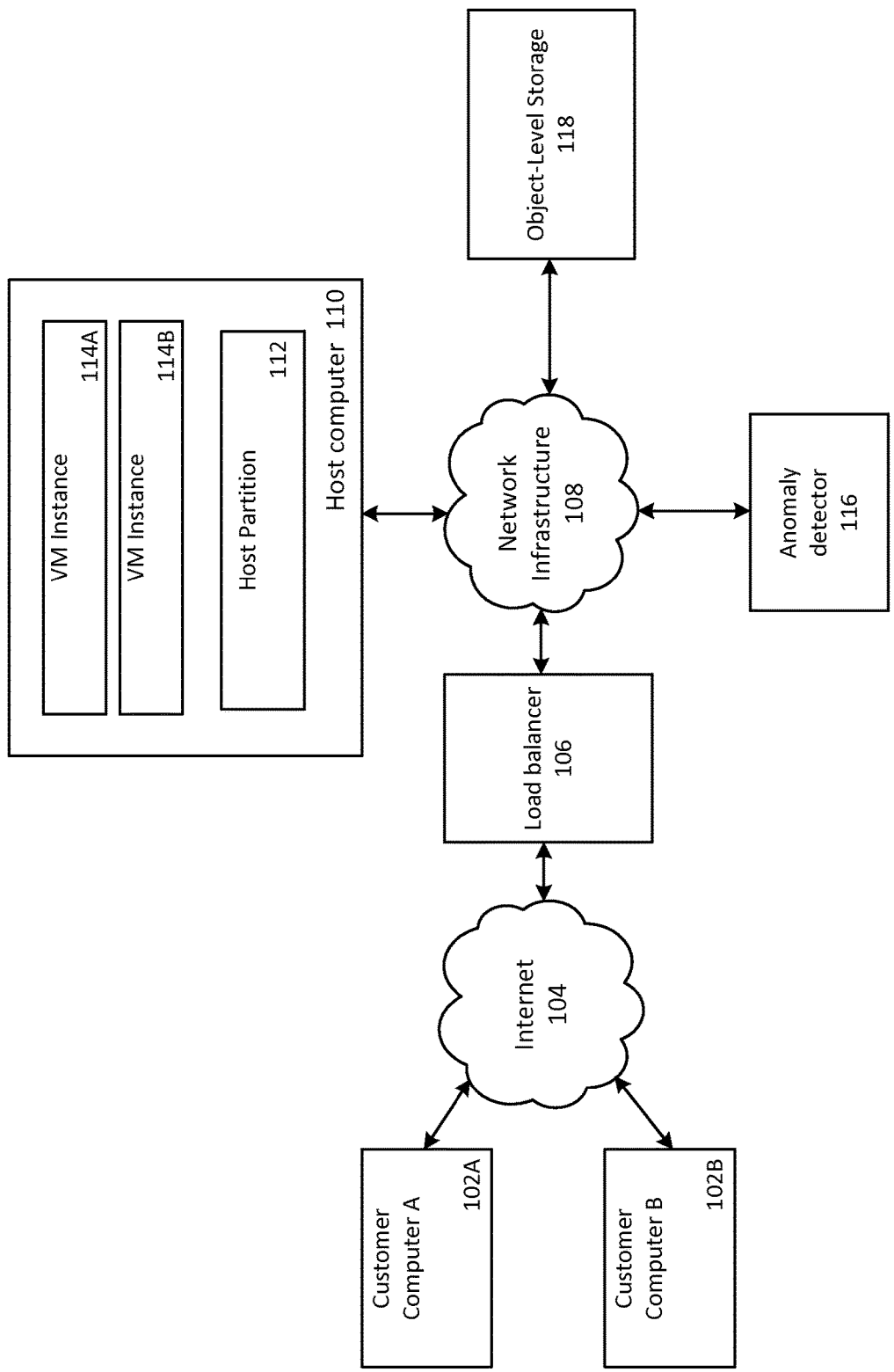
FIG. 1 depicts an example operating environment in which embodiments may be implemented.

One problem with determining a possible cause of a computing node being in an anomalous condition, and possible action to remediate the computing node, is that there are many metrics to analyze. There may be too many metrics to analyze in an expedient or efficient manner. A way to aid in analyzing these metrics is to pare down the full set of metrics to a subset of metrics that are determined to be likely to indicate the cause of the anomalous condition. For instance, there may be 100 metrics analyzed (such as those relating to network bandwidth, or disk I/O), and these 100 metrics may be pared down to 5 or 10 metrics that are presented to a customer as possibly relating to the anomalous state. This subset of metrics is more manageable for a user to analyze, which aids in determining a cause of the anomalous state.

A way to identify a subset of metrics as possibly relating to the cause of the anomalous state involves comparing the current state of a computing node with a prior state of that computing node, or another computing node. Metrics for these two computing nodes over these two time periods may be compared with multiple techniques, and a weighted average of the results of applying these techniques to these metrics may be determined to produce a single value that indicates the likely relative importance of specific metrics. These techniques that may be applied to metrics may include (1) the magnitude of change of a metric between the two periods; (2) how steady the value of a metric is relative to a present change; (3) an temporal ordering of the metrics changing; and (4) application-specific metrics.

When these techniques have been applied to the two computing nodes over the two time periods, a subset of the metrics may be determined to be likely to relate to the anomalous state of the comparison computing node. This subset of metrics may be supplied to a user for further investigation as to the cause of the anomalous state. By supplying a subset of the full set of metrics to the user, the user may more quickly determine the cause of the anomalous state, since he or she will have fewer metrics to initially analyze. In embodiments, a user who has been provided with these metrics may indicate back to a system that implements embodiments disclosed herein how valuable each metric was. Then, this system may change its weighting of the metrics based on this user-supplied information.

The present techniques may be distinguished from other techniques of comparing two computing nodes, such as clustering. In clustering-type techniques, computing nodes are grouped based on likeness. While grouping computing nodes based on likeness may involve an analysis of metrics, there is no inquiry as to which metrics may be more important in determining a cause of a computing node being in a certain condition (e.g., an anomalous condition). In comparison, the present techniques may be used to identify those metrics that are more important in determining a cause of a computing node being in a certain condition.

FIG. 1 depicts an example operating environment in which embodiments may be implemented. More detail about the operating environment, including more detail about individual components within the operating environment of FIG. 1 is given with respect to FIGS. 8-10. Generally, the operating environment of FIG. 1 includes a multi-customer web services platform that comprises multiple virtual machine instances executing on multiple host computers (the instances and host computers may both be described as being computing nodes), with an anomaly detector 116 that determines whether a computing node is experiencing anomalous performance, and if so, identifies one or more metrics among a plurality of metrics that are likely to be useful in identifying a cause of this anomalous performance.

Customer computer A 102A and customer computer B 102B are computers possessed by customers, which are configured to access the multi-customer web services platform via a public network, e.g. Internet 104. In turn, the connection point between the multi-customer web services platform and Internet 104 is load balancer 106. In embodiments, load balancer 106 may be implemented in a VM instance (such as VM instance 114A). Within the multi-customer web services platform, load balancer 106 connects to another computer network—network infrastructure 108— and balances load among incoming requests to a customer's VM instances. For example, a customer may provide a web service (such as a photo sharing web site) that is implemented on both VM instances 114A and 114B. As users of that photo sharing web site attempt to access that photo sharing web site across Internet 104, load balancer 106 may receive these requests and balance the load of these requests among VM instances 114A and 114B, so that neither VM instance is under significantly more load than the other VM instance.

Network infrastructure 108 may be an intranet that is separate from Internet 104. Also connected to network infrastructure 108 are anomaly detector 116, object-level storage 118, and host computer 110.

Host computer 110 is configured to execute one or more virtual machine instances (depicted here as VM instance 114A and VM instance 114B) and a host partition 112. While host computer 110 is depicted here as executing two VM instances 114, it may be appreciated that host computer 110 may execute more or fewer VM instances.

In embodiments, a customer directs the multi-customer web services platform to execute one or more VM instances on the customer's behalf. These VM instances may then execute to perform functions for the customer, such as a function of a web server for the customer's web site, or to perform compute functions, such as encoding video.

In addition to this aspect of the web services platform, customers may also store data in object-level storage 118. Object-level storage 118 is depicted as storing data as objects (e.g., a customer instructs the web services platform to store or retrieve a specific file). It may be appreciated that there are embodiments where a block-level storage service is implemented instead of, or in addition to, object-level storage 118. Object-level storage 118 may also be used by other devices on the web services platform to store data. For example, anomaly detector 116 may store data on object-level storage 118 in the process of determining whether a computing node is experiencing anomalous performance.

Within this networking environment, anomaly detector 116 may detect whether computing nodes are in an abnormal state. A computing node may include VM instance 114A, VM instance 114B, host partition 112, host computer 110, load balancer 106, and networking hardware, such as an edge router. Anomaly detector 116 may take one computing node as a baseline node over a selected period of time that may be referred to as the baseline period of time (which is considered to be in a non-anomalous condition), and take a second computing node as a comparison computing node over a second selected period of time that may be referred to as a comparison period of time. Anomaly detector 116 may then compare the baseline node over the baseline time with the comparison node over the comparison time to determine whether there are any anomalies with the comparison node relative to the baseline node. Anomaly detector 116 may perform this comparison by implementing the operating procedures of FIGS. 2-4, discussed herein. Where anomaly detector 116 retrieves information about a computing node or stores information about whether an anomaly is detected, anomaly detector 116 may retrieve and store this information from object-level storage 118.

The baseline node and comparison node that anomaly detector 116 compares may be two different computing nodes—e.g., VM instance 114A and VM instance 114B. In other embodiments, the baseline node and comparison node that anomaly detector 116 compares may be the same computing node—e.g., they are both VM instance 114A—but where the baseline and comparison time periods are different time periods (e.g., the baseline time period is September 1st from 9-10 am and the comparison time period is September 8th from 9-10 am).

It may be appreciated that the system architecture of FIG. 1 provides an example of embodiments, and that there are other embodiments that may implement the present techniques. For example, functions of anomaly detector 116 may be performed in a decentralized manner among a plurality of computing nodes, rather than in the centralized manner depicted in FIG. 1. Additionally, functions of anomaly detector 116 may be performed within host computer 110 itself, and also possibly for other computing nodes, such as those connected to network infrastructure 108.

Figure 2:
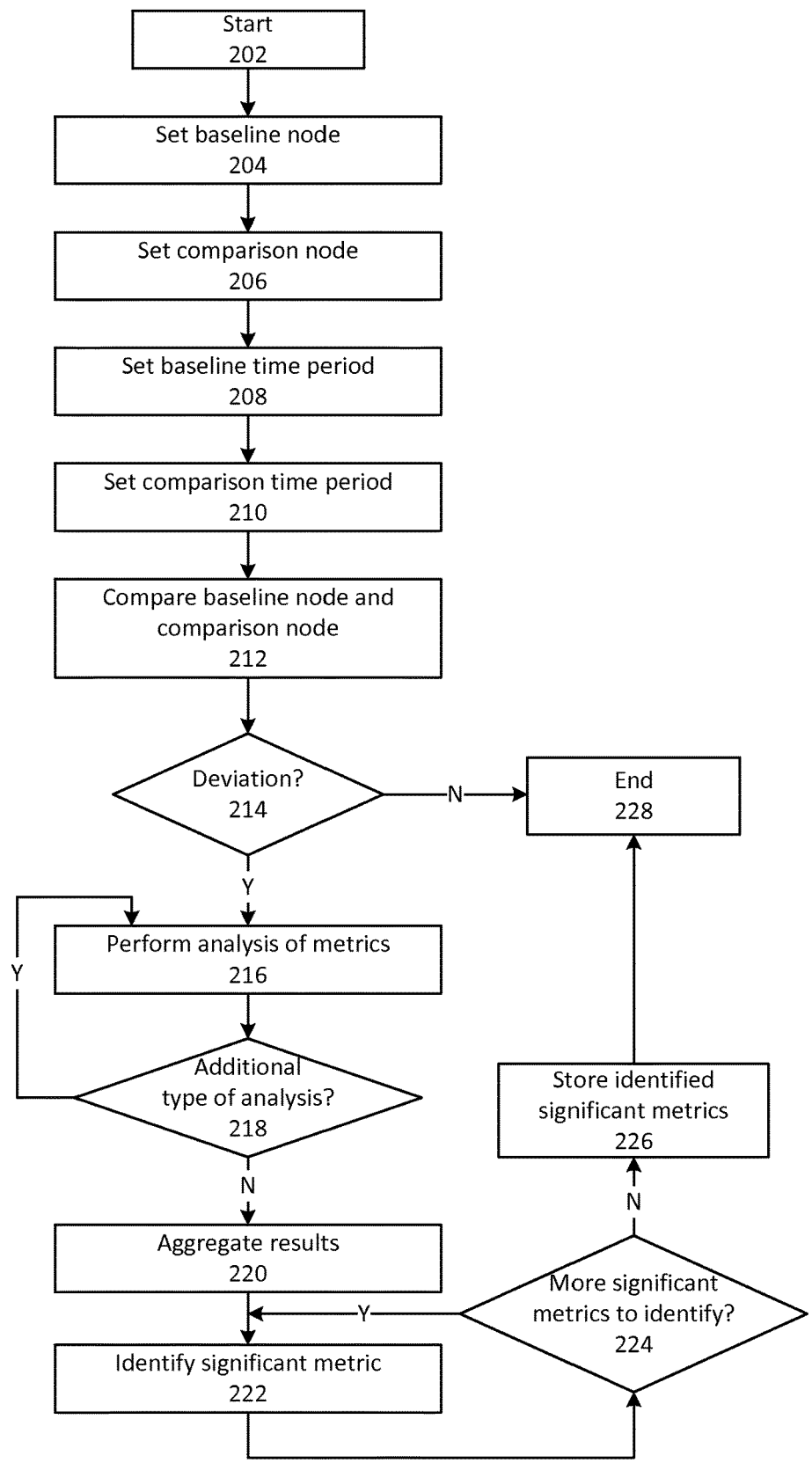
FIG. 2 depicts example operating procedures for detecting anomalies in a computing node.

FIG. 2 depicts example operating procedures for detecting anomalies in a computing node. While embodiments described with respect to FIG. 2 (and FIGS. 3-4) deal with detecting anomalies in a computing node, it may be appreciated that these techniques may also be applied to application processes that execute on a computing node. It may be appreciated that there are embodiments of FIG. 2 (and FIGS. 3-4) that implement fewer, or more, operations than are depicted. For example, there may be embodiments that omit operation 214. It may also be appreciated that there are embodiments of FIG. 2 (and FIGS. 3-4) that implement the operations depicted in a different order than is depicted herein. For example, there may be embodiments that switch the order of operations 204 and 206. The operating procedures of FIG. 2 begin with operation 202, and then move to operation 204.

Operation 204 depicts setting a baseline computing node. Here, the baseline computing node will be considered to exhibit normal operating conditions, and contrasted with a comparison computing node to determine if the comparison computing node is in an anomalous condition. In embodiments, operation 204 may comprise receiving user input indicative of the baseline computing node. This user input may be received at a web interface of a web services platform that contains the baseline computing node (and the comparison computing node). In embodiments, a selection of suggested baseline computing nodes may be provided via the web interface, based on those suggested baseline computing nodes sharing a commonality with the comparison computing node. For example, the commonality may be that the computing nodes are accessible by the same user or customer, that the computing nodes run the same operating system version, that the computing nodes run the same version of an application, or that the computing nodes perform the same function (e.g., serve web pages for a photo sharing web site).

In embodiments, the baseline computing node and the comparison computing node may be the same computing node. The baseline computing node may be that computing node at an earlier point in time, and the comparison computing node may be that computing node at a later point in time. Comparing the computing node against itself at an earlier point in time may be useful where a software or hardware configuration of the computing node, or a role performed by the computing node, has not changed between the baseline and comparison time periods. In comparing the same computing node against itself at an earlier point in time, variables (such as unknown differences in configuration between two computing nodes) may be reduced, and a smaller set of variables may lead to more accurately identifying metrics likely to be associated with a computing node being in an anomalous condition. After operation 204, the operating procedures of FIG. 2 move to operation 206.

Operation 206 depicts setting a comparison computing node. Operation 206 may be implemented in a similar manner as operation 204. After operation 206, the operating procedures of FIG. 2 move to operation 208.

Operation 208 depicts setting a time period to evaluate the baseline computing node. This time period may be determined in response to receiving user input indicative of the time period—similar to as discussed with respect to operation 204. In embodiments, there may be a connection between the baseline time period and the comparison time period (which is discussed in operation 210). For instance, they may both be the same length of time—e.g. one hour. And they may both take place at the same time of day (e.g., 9-10 am), on the same day of the week (e.g., Tuesday), or the same day of the month (e.g., the 1st of the month). There may also be permutations of these connections—e.g., the baseline time period may be the first Tuesday of the prior month from 9-10 am, and the comparison time period may be the first Tuesday of the current month from 9-10 am. In other embodiments, the baseline time period and the comparison time period may be the same time period, where the baseline computing node and the comparison computing node are different (e.g., both time periods may be from 9-10 am on a given day).

In embodiments, the time period to evaluate the baseline computing node may be set automatically. In embodiments, historical information about the baseline computing node may be analyzed to determine a trend. For example, it may be that, on weekdays, resource usage increases, beginning in the morning, and peaking at 2-3 pm. And it may be that this peak does not occur on weekends. Thus, where the comparison time period is from 2-3 pm on a Thursday, it may be determined that a baseline time period of 2-3 pm on a weekday is acceptable, but a time period of 2-3 pm on a weekend (or some other time that is not from 2-3 pm) is not acceptable for use as the baseline time period. Where a baseline time period of 2-3 pm on a weekday is acceptable to use as the baseline time period, such a time period may be selected from the baseline computing node's history and used as the baseline time period.

In other embodiments, a time period where values for metrics vary less than a predetermined amount may be selected as the baseline time period. Or, multiple prospective time periods may be considered and one may be selected from them. For instance, where the comparison time period is on a Friday from 9-10 am, then the prior five Fridays from 9-10 am may be considered for the baseline time period, and the one where the values vary the least may be selected. In other embodiments, these multiple prior time periods may be aggregated to serve as the baseline time period. For example, the values of the metrics in the first minute of that time period may be averaged and used for the first minute of the baseline time period; the values of the metrics in the second minute of that time period may be averaged and used for the second minute of the baseline time period. Other operations may be performed to set the baseline time period automatically. After operation 208, the operating procedures of FIG. 2 move to operation 210.

Operation 210 depicts setting a time period to evaluate the comparison computing node. In embodiments, operation 210 may be implemented in a similar manner as operation 208. In embodiments, the comparison time period may be the current period of time, or a future time period—e.g., starting now and running for one hour.

In embodiments, the comparison time period may be set automatically. For instance, the comparison time period may be set with a starting point based on the occurrence of an event (e.g., an alarm, a particular action taken by the system, or something reported by a user), and a finishing point of the current time. It may be that one of these events is generally associated with an anomaly (e.g., an alarm is triggered when a network packet cannot be successfully sent to the comparison computing node). So, starting the comparison time period at the occurrence of the event may be more likely to result in a time period that captures an anomaly than starting the comparison time period at some other time. After operation 210, the operating procedures of FIG. 2 move to operation 212.

Operation 212 depicts comparing the baseline computing node over the baseline time period and the comparison computing node over the comparison time period. This may comprise accessing log files about each computing node that are stored on the computing nodes, or elsewhere (such as in object-level storage 118). This may also comprise accessing log files from other computing nodes that relate to the destination or comparison computing nodes (e.g., load balancer 106 may handle load balancing for VM instances 114A and 114B, and may store information about those instances). In embodiments, this information may be periodically gathered independent of a comparison of these two computing nodes for a possible anomaly in the comparison computing node. In other embodiments, this information may be gathered at the time that such a comparison of computing nodes is made.

Comparing the two computing nodes may be performed on a metric-by-metric basis. For example, metrics that may be compared between the baseline computing node and the comparison computing node include: CPU utilization; a number of bytes read from disk; a number of bytes written to disk; a number of write operations to disk; a number of bytes transferred to the computing node; a number of bytes transferred from the computing node; a number of bytes in an IPv6 format transferred to the computing node; a number of bytes in an IPv6 format transferred from the computing node; a rate of inbound traffic; a rate of outbound traffic; a number of inbound connections established with other computing nodes; a number of received network packets dropped; and a number of transmitted network packets dropped.

Additional metrics that may be compared between the baseline computing node and the comparison computing node include: a number of bytes of network traffic received according to a Secure Socket Layer (SSL) protocol; a number of bytes of network traffic transmitted according to a SSL protocol; a number of bytes of network traffic received via an internal IP address; a number of bytes of network traffic transmitted via an internal IP address; a number of bytes of network traffic received via a publicly-accessible IP address; a number of bytes of network traffic transmitted via a publicly-accessible IP address; a number of bytes of network traffic received from the INTERNET; a number of bytes of network traffic transmitted to the INTERNET; a number of bytes of network traffic received from an internal network; a number of bytes of network traffic transmitted to an internal network; a number of bytes of network traffic received from another datacenter of an internal network; and a number of bytes of network traffic transmitted to another datacenter of an internal network.

Where the computing node is a load balancer, additional metrics that may be compared between the baseline computing node and the comparison computing node include: a type and number of 200-level, 300-level, 400-level, and 500-level HTTP (hypertext transfer protocol) codes produced for a computing node that a load balancer balances load for; a type and number of 400-level and 500-level HTTP codes produced; a number of healthy computing nodes that the load balancer may assign load to; a number of unhealthy computing nodes that the load balancer may assign load to; and a number of connections established between the load balancer and computing nodes that the load balancer may assign load to. After operation 212, the operating procedures of FIG. 2 move to operation 214.

A metric may also be a latency—an amount of time—to complete an operation; an amount of a resource that is being utilized (e.g., an amount of system memory being utilized); an error or success rate of performing an operation; a result or status code that is generated as a result of attempting to perform an operation; or a number of operations that are attempted or completed within a time period.

Operation 214 depicts determining whether there is a deviation between the baseline computing node over the baseline time period and the comparison computing node over the comparison time period. This may comprise determining whether one or more of the above metrics differs by a predetermined amount between the baseline computing node over the baseline time period and the comparison computing node over the comparison time period. This deviation may be measured in terms of magnitude, in terms of variance (e.g., where the value of a metric is static in the baseline computing node over the baseline time period, a small deviation from that static value in the comparison computing node over the comparison time period may be considered to be a deviation by a predetermined value), or with a variety of other quantifiable measurements. Where it is determined that there is not a deviation between the baseline computing node over the baseline time period and the comparison computing node over the comparison time period, it may be considered that there is no anomalous condition associated with the comparison computing node, so further analysis into the cause of an anomalous condition may be omitted.

If it is determined that there is a deviation between the baseline computing node over the baseline time period and the comparison computing node over the comparison time period, the operating procedures of FIG. 2 move to operation 216. If it is determined that there is no deviation between the baseline computing node over the baseline time period and the comparison computing node over the comparison time period, the operating procedures of FIG. 2 move to operation 228, where the operating procedures of FIG. 2 end. In embodiments, prior to moving from operation 214 to operation 228, a customer may be informed that there is no (or minimal) deviation between the baseline computing node over the baseline time period and the comparison computing node over the comparison time period.

Operation 216 depicts performing analysis of the metrics of the baseline computing node over the baseline time period and the comparison computing node over the comparison time period. This analysis (sometimes referred to herein as a type of analysis) may generally be referred to as a statistical measure (or type of statistical measure). This analysis is described in more detail with respect to FIG. 3. Generally, this analysis may be one of (1) a magnitude of change of a metric; (2) a variation of the metric; (3) an order of events of the metric; or (4) an application-specific metric. After operation 216, the operating procedures of FIG. 2 move to operation 218.

Operation 218 depicts determining whether an additional type of analysis is to be performed. For example, given the four types of analysis described above, there may be embodiments that implement one, two, three, or all four types of analysis. Where it is determined that an additional type of analysis is to be performed, the operating procedures of FIG. 2 move back to operation 216. Where it is determined that an additional type of analysis is not to be performed, the operating procedures of FIG. 2 move to operation 220.

Operation 220 depicts aggregating the results of the analysis performed in operation 216. Where only one of the four types of analysis described in operation 216 is used, operation 220 may be omitted. Where multiple types of analysis are used, aggregating the results may comprise, on a per-metric basis, performing a weighted average of the analyses performed in operation 216. This operation is described in more detail with respect to FIG. 3. After operation 220, the operating procedures of FIG. 2 move to operation 222.

Operation 222 depicts identifying a significant metric within the aggregated results. This identified significant metric may be the metric with the largest value based on the weighted average calculated in operation 220 (or where no weighted average is taken because only a single analysis is used in operation 216—the result of that single analysis). The metric with the largest value based on the weighted average may be considered to be the metric determined to be most likely to identify a cause of an anomalous condition of the comparison computing node. In embodiments, rather than identifying a single significant metric, some plurality of metrics that make up a subset of the total number of metrics may be identified here as significant metrics (e.g., 5 metrics of the 100 total metrics may be identified). After operation 222, the operating procedures of FIG. 2 move to operation 224.

Operation 224 depicts determining whether there are additional significant metrics to identify. For example, where the top 5 metrics that may indicate a cause of anomalous condition of the comparison computing node are to be produced for a user, operation 224 may loop such that operation 222 executes five times. Where it is determined that there are additional significant metrics to identify, the operating procedures of FIG. 2 return to operation 222. Instead, where it is determined that there are not additional significant metrics to identify, the operating procedures of FIG. 2 move to operation 226.

Operation 226 depicts storing the identified significant metrics. This may comprise storing the identified significant metrics in a location accessible to a user. For example, these identified significant metrics may be stored in object-level storage 118, and the user may access them via a web interface to a web services platform. In other embodiments, the identified significant metrics may be more directly supplied to the user, such as via email. After operation 226, the operating procedures of FIG. 2 move to operation 228, where the operating procedures of FIG. 2 end.

In embodiments, the operating procedures of FIG. 2 may be run on a continual basis by continuously comparing the values of the metrics of the comparison computing node as they may vary over time against the baseline computing node metrics for the baseline time period. Where the values for metrics for the comparison computing node differ from a historical trend for those values by more than a predetermined amount, a user may be notified (such as by storing an indication of this deviation in a memory location that is accessible by the user). Where the operating procedures of FIG. 2 are run on a continual basis (and, for example, used to analyze a new version of a process that runs on a computing node rather than to analyze a computing node), the quality of a new version of the process may be assessed. If any metrics change unexpectedly when the new version of the process is implemented, this may be an indication that there is a problem with the new version of the process, and a metric may be identified that may indicate a cause of that problem. It may be appreciated that analyzing the quality of a new version of a process may be performed in embodiments where the operating procedures of FIG. 2 are run one isolated time (or a few isolated times), rather than on a continual basis.

In other embodiments, the operating procedures of FIG. 2 may be run on a larger system that is made up of subsystems, where these subsystems behave differently (e.g., one subsystem hosts VM instances while another subsystem serves as a load balancer to those VM instances). Where it is determined or believed that the overall system may have an anomaly in the comparison time period, which particular subsystem (or subsystems) that is the cause of the anomaly may not be known. In this scenario, the anomaly detection of the operating procedures of FIG. 2 may be performed against each subsystem for the comparison period, and the most anomalous subsystem may be determined. This technique is similar to finding a metric likely to identify the cause of a subsystem being in an anomalous condition, but at a higher level—finding a subsystem likely to identify the cause of a system being in an anomalous condition.

These techniques of finding a subsystem likely to identify the cause of a system being in an anomalous condition may be performed at multiple levels of granularity. For example, it may be determined that the overall system was in an anomalous condition, but not known which subsystem was the cause of this anomalous condition. Anomaly detection may be run against each subsystem (e.g., a node or a process) of the system (or a subset of the subsystems) to determine the most anomalous subsystem (e.g., the subsystem that has a weighted result described herein with the largest value). Where there are multiple levels of subsystems (e.g., the system is made up of computing nodes which each run multiple processes), this process of identifying a particular subsystem recursively until a lowest-level subsystem (or other desired level of subsystem) is reached. For example, where a particular computing node is determined as being the node likely to be the cause of the anomaly, then these techniques may be performed on the processes of that computing node to determine which of the computing node's processes is likely to be the cause of the anomaly.

Figure 3:
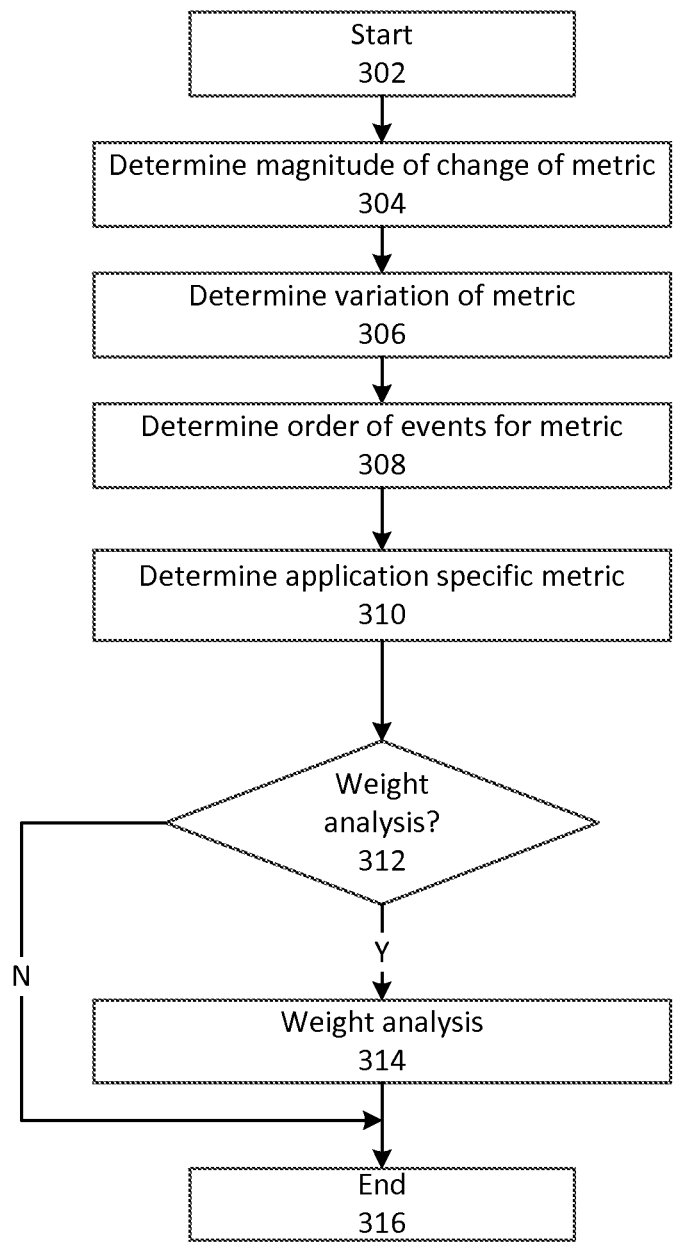
FIG. 3 depicts example operating procedures for performing analysis of metrics.

FIG. 3 depicts example operating procedures for performing analysis of metrics. For example, the operating procedures of FIG. 3 may be implemented to perform the effects of operations 216-220 of FIG. 2. The operating procedures of FIG. 3 may be implemented where the operating procedures of FIG. 2 are implemented, such as on anomaly detector 116 of FIG. 1. As with FIG. 2, it may be appreciated that there are embodiments of FIG. 3 that implement fewer, or more, operations than are depicted. For example, there may be embodiments that omit operations 304 or 306. It may also be appreciated that, as with FIG. 2, there are embodiments of FIG. 3 that implement the operations depicted in a different order than as depicted. For example, there may be embodiments that switch the order of operations 304 and 306. The operating procedures of FIG. 3 begin with operation 302, and then move to operation 304.

Operation 304 depicts determining a magnitude of change of a metric. This may comprise a magnitude of the change of the metric between the baseline computing node over the baseline time period and the comparison computing node over the comparison time period. For example, if the metric has a value of 3 for the baseline computing node, and has a value of 13 for the comparison computing node, the magnitude of change may be considered to be 10 (or if the baseline computing node has a value of 13 and the comparison computing node has a value of 3).

Where the values of the metric vary over the baseline or comparison time periods, analysis may be performed to determine a single magnitude of change. For example, an average value of the metric over the time period may be calculated and compared to a similarly calculated average value over the other time period. Or, the magnitude of change for the full amount of time may be calculated, and then an average of that magnitude may be taken. After operation 304, the operating procedures of FIG. 3 move to operation 306.

Operation 306 depicts determining a variation of the metric. It may be that a metric's value does not change much in terms of magnitude. However, a small change may still be considered important where the value of the metric has been static, or near static. For example, let the value of a metric be 3 for the entirety of the baseline time period. Where the value changes to 3.5 for the comparison time period, that may be considered to be relatively significant, because the value was so steady at 3 during the baseline time period. Thus, for operation 306, where the variance is greater, operation 306 may assign a larger significance to that metric. After operation 306, the operating procedures of FIG. 3 move to operation 308.

Operation 308 depicts determining an order of events for a metric. It may be that a change in a metric that occurred earlier relative to a change in another metric is considered to be more likely to be related to a root cause of anomalous state. Determining an order of events for a metric may comprise accessing a log file that contains values for metrics and times at which those values changed. Operation 308 may comprise assigning a larger significance to a metric that changed at an earlier time relative to a significance for a metric that changed at a later time. After operation 308, the operating procedures of FIG. 3 move to operation 310.

Operation 310 depicts determining an application-specific metric. An application-specific metric may be one that is specific to an application rather than to a computing node as a whole. For instance, the number of rows of a database application may be an application-specific metric where only that database application accesses the database and its rows, while an amount of bytes read from a disk may include reading those database rows, but may be considered to be applicable to the computing node as a whole, because other processes also engage in reading bytes from the disk.

A significance given to an application-specific metric may vary based on the application itself, and a role performed by the computing node. For example, if the primary role of the computing node is to perform database functions, then metrics relating to a database application may be considered more significant than metrics relating to other applications (like word processing applications, or web server applications). After operation 310, the operating procedures of FIG. 3 move to operation 312.

Operation 312 depicts determining whether to weight the analyses of operations 304-310. In embodiments, it may be that one analysis of operations 304-310 is considered to be more significant than another analysis in determining a metric likely to relate to a cause of an anomalous state. Where this is the case, it may be determined to weight the analyses of these operations to reflect that they are not all equal in significance. Where it is determined to weight the analyses of operations 304-310, the operating procedures of FIG. 3 move to operation 314. Where it is determined not to weight the analyses of operations 304-310, the operating procedures of FIG. 3 move to operation 316, where the operating procedures of FIG. 3 end. Where it is determined not to weight the analyses of operations 304-310, before moving to operation 316, the analyses may be normalized (so that they vary over the same range, e.g., from 0 to 1, inclusive), and then summed.

Operation 314 depicts weighting the analyses of operations 304-310. This may comprise normalizing the analyses (as described with respect to operation 314) and then weighting the analyses. Weighting the analyses may comprise scaling the analyses. For example, take an embodiment where two analyses are considered—the magnitude of change, and the order of occurrence. It may be determined that the magnitude of change is half as important as the order of occurrence in identifying a metric that is likely to identify a cause of anomalous condition. Where this is the case, the determination of the magnitude of change may be multiplied by 0.33 and the determination of the order of occurrence may be multiplied by 0.67. Then, the two results of performing these analyses may be summed. After operation 314, the operating procedures of FIG. 3 move to operation 316, where the operating procedures of FIG. 3 end.

Other embodiments that implement statistical measures may include relative entropy techniques (including a multinomial regression test), a Tukey technique (that may be quartile-based) and Gaussian techniques. A relative entropy statistical measure may be used to perform a comparison of two distributions, using a binning procedure and comparing the relative bin sizes. A range/mean divergence test may be performed on a Tukey or Gaussian statistical measure. This may involve performing a point (on the comparison node metrics) vs. distribution (on the baseline metrics) comparison by analyzing the value difference between a comparison point and the baseline mean. Scoring may be based upon a rank quadratic mapping function. A range/range divergence test may be performed on a Tukey or Gaussian statistical measure. This may involve performing a point (on the comparison node metrics) vs. distribution (on the baseline metrics) comparison by analyzing the value difference between a comparison point and the baseline standard deviation. Scoring may be based upon a rank quadratic mapping function.

A time test may be performed on a Tukey or Gaussian statistical measure. This may involve performing a point (on the comparison node metrics) vs. distribution (on the baseline metrics) comparison by ranking the first anomalous point for each metric. A durational test may be performed on a Tukey or Gaussian statistical measure. This may involve performing a point (on the comparison node metrics) vs. distribution (on the baseline metrics) comparison by ranking the number of anomalous points for each metric. A value test may be performed on a Tukey or Gaussian statistical measure. This may involve performing a point (on the comparison node metrics) vs. distribution (on the baseline metrics) comparison by finding the value of the maximum and minimum anomalous points for each metric.

Figure 4:
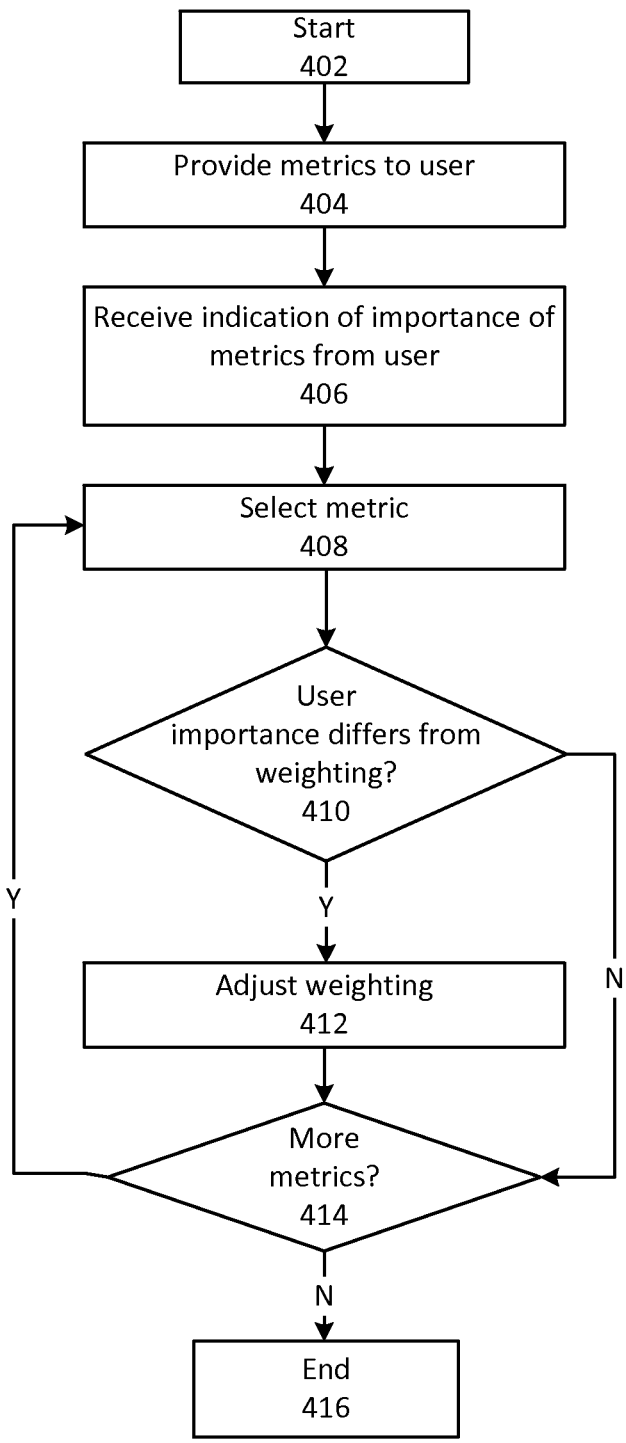
FIG. 4 depicts example operating procedures for determining how to weight metrics based on user input.

FIG. 4 depicts example operating procedures for determining how to weight metrics based on user input. This determination of how to weight metrics may be used weighting the analyses in operation 314 of FIG. 3. The operating procedures of FIG. 4 may be implemented where the operating procedures of FIG. 3 are implemented, such as on anomaly detector 116 of FIG. 1. As with FIGS. 2-3, it may be appreciated that there are embodiments of FIG. 4 that implement fewer, or more, operations than are depicted. For example, there may be embodiments that omit operations 408 and 414. It may also be appreciated that, as with FIGS. 2-3, there are embodiments of FIG. 4 that implement the operations depicted in a different order than as depicted. For example, there may be embodiments where operation 408 is implemented before operation 404. The operating procedures of FIG. 4 begin with operation 402, and then move to operation 404.

Operation 404 depicts providing metrics to a user. These metrics may be the metrics identified as likely to relate to the cause of anomalous condition, as identified under the operating procedures of FIG. 2. Providing the metrics to the user may comprise storing the identified metrics in a known location that the user can retrieve (such as a known location in object-level storage 118), providing the identified metrics to the user in a web interface that the user may access, or emailing the identified metrics to the user. After operation 404, the operating procedures of FIG. 4 move to operation 406.

Operation 406 depicts receiving an indication of an importance of metrics from the user. This may comprise a similar technique as described with respect to operation 404 (e.g., the user stores this indication of importance in a known location, enters it into a web interface, or emails them back to anomaly detector 116). This indication of importance may be expressed in a variety of ways. For example, the user may rank the metrics from most useful to least useful; may identify which metrics were useful and which were not useful; or assign a rating to each metric (e.g., from 1 to 10, inclusive, where 1 signifies "not useful" and 10 signifies "very useful").

Operation 406 may also comprise receiving an indication of context from a user. This context may be a context that the user believes his or her computing node to have, which relates to the anomaly. For instance, the context may be that the computing node is experiencing a denial-of-service (DOS) attack, that some aspect of the computing node's performance is slow, or that the computing node never worked in the first place (e.g., the user desired to start up the computing node to function as a load balancer, and that computing node never correctly functioned as a load balancer). Where the customer is able to determine this context, he or she may indicate in operation 406. Then, when another user implements the operating procedures of FIG. 2, he may indicate a context of his or her computing node. This context may be another statistical measure used in the weighted analysis of FIG. 3 (e.g., a statistical measure such as the statistical measures described with respect to operations 304-310). After operation 406, the operating procedures of FIG. 4 move to operation 408.

Operation 408 depicts selecting a metric among the metrics identified by the user in operation 406. For example, where multiple metrics are identified by the user, this may comprise selecting one of these multiple metrics (such as the topmost metric in a list that has not already been analyzed in operation 408). After operation 408, the operating procedures of FIG. 4 move to operation 410.

Operation 410 depicts determining whether an importance for a metric indicated by the user differs from a current weighting of the metric. For example, anomaly detector 116 may maintain an internal weighting of metrics that it uses in performing the operating procedures of FIG. 3. Anomaly detector 116 may compare this internal weighting for a particular metric against the importance indicated by a user. In other embodiments, anomaly detector 116 may maintain a weighting of analyses performed on metrics. In these embodiments, anomaly detector 116 may perform these weighted analyses on the metrics supplied to the user to determine a relative weighting of the metric (e.g., that this particular metric was considered to be the third most-important metric in this situation).

In embodiments, determining that an importance for a metric indicated by the user differs from a current weighting of the metric may comprise determining that any difference exists (e.g., the user identifies the metric as being the third most-important in this situation, and anomaly detector 116 has determined it to be the fourth most-important in this situation). In other embodiments, determining that an importance for a metric indicated by the user differs from a current weighting of the metric may comprise determining that at least a predetermined amount of difference exists (e.g., The importance identified by the user must vary by at least five positions from a current weighting of the metric. So, where the user identifies a metric as being the second most-important and the current weighting has it as the seventh most important, that meets the predetermined distance of five positions. However, where the user identifies a metric as being the second most-important and the current weighting has it as the sixth most important, that does not meet the predetermined distance of five positions, so it would not be determined here that an importance for a metric identified by the user differs from a current weighting of the metric.).

Where it is determined that the importance for a metric indicated by the user differs from the current weighting of the metric, the operating procedures of FIG. 4 move to operation 412. Where it is determined that the importance for a metric indicated by the user does not differ from the current weighting of the metric, the operating procedures of FIG. 4 move to operation 414.

Operation 412 depicts adjusting the weighting for the metric. In embodiments, this may comprise adjusting the weighting for the metric (or the weighting of the analyses that produces the weighting of the metric) to what the user has identified. In other embodiments, this may comprise factoring in this input with other information known about the importance of a metric, such as in a Bayesian probability model.

In embodiments, different users may have their input into the importance of metrics affect the weightings differently. For example, an administrator of anomaly detector 116 may have his or her input affect the weightings more significantly than an end user that is a customer of a web services platform that anomaly detector 116 operates on. This adjusted weighting may then be used in the operating procedures of FIG. 3 to identify metrics to that particular user, or may be used to identify metrics to other users, as well.

In other embodiments, rather than adjusting the weighting of statistical measures (such as those statistical measures described with respect to operations 304-310), this user input may be another statistical measure that itself is weighted against the other statistical measures. That is, information about the user's indicated importance of metrics may be weighted along with a magnitude of change of the metrics, and an order of operations of the metrics. Where the user supplied information about context, this context information may also be used as a statistical measure that is used in weighting the statistical measures to identify one or more significant metrics. After operation 412, the operating procedures of FIG. 4 move to operation 414.

Operation 414 depicts determining whether there are additional metrics indicated by the user that have not yet been analyzed. For example, where the multiple metrics supplied by the user are in a list, operation 414 may comprise determining if the end of this list of metrics has been reached. Operation 414 may be reached from operation 412, or from operation 410 where it is determined that the importance for a metric indicated by the user does not differ from the current weighting of the metric.

Where it is determined that there are additional metrics indicated by the user that have not yet been analyzed, the operating procedures of FIG. 4 return to operation 408. Where it is determined that there are not additional metrics indicated by the user that have not yet been analyzed, the operating procedures of FIG. 4 move to operation 416, where the operating procedures of FIG. 4 end.

Figure 5:
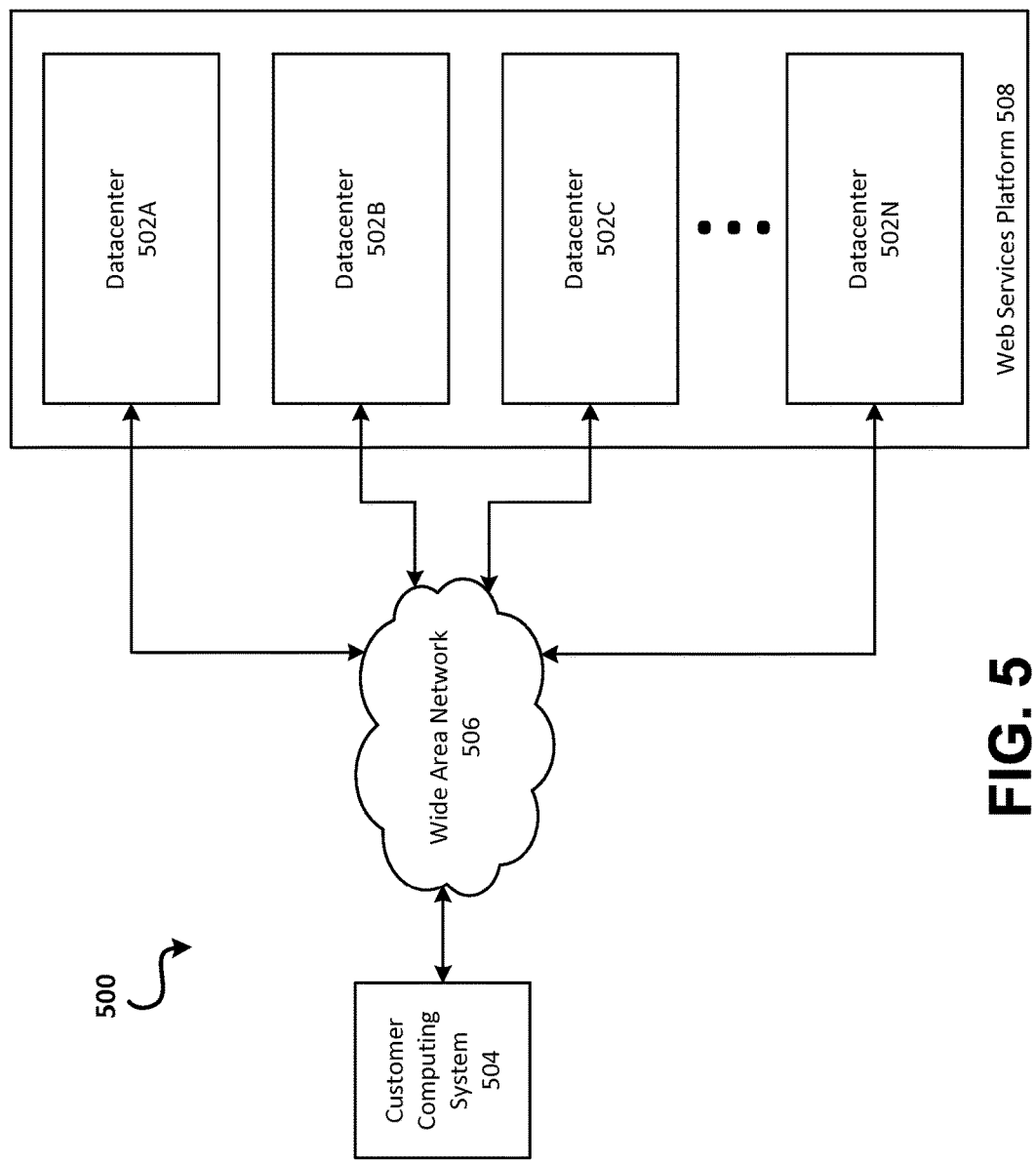
FIG. 5 depicts an example of a suitable computing environment in which embodiments described herein may be implemented.
Figure 6:
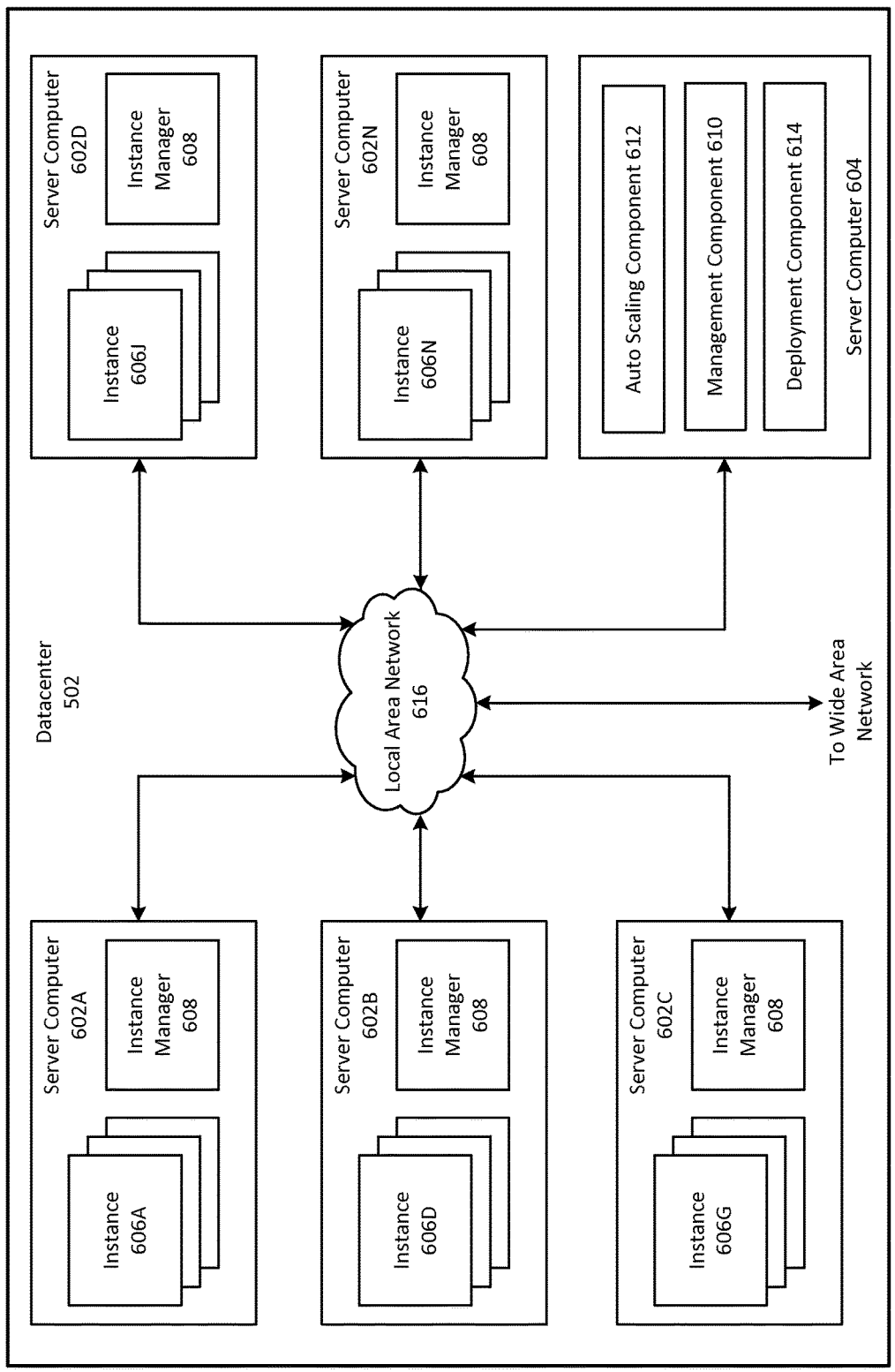
FIG. 6 depicts a computing system diagram that illustrates one configuration for datacenter that implements web services platform.
Figure 7:
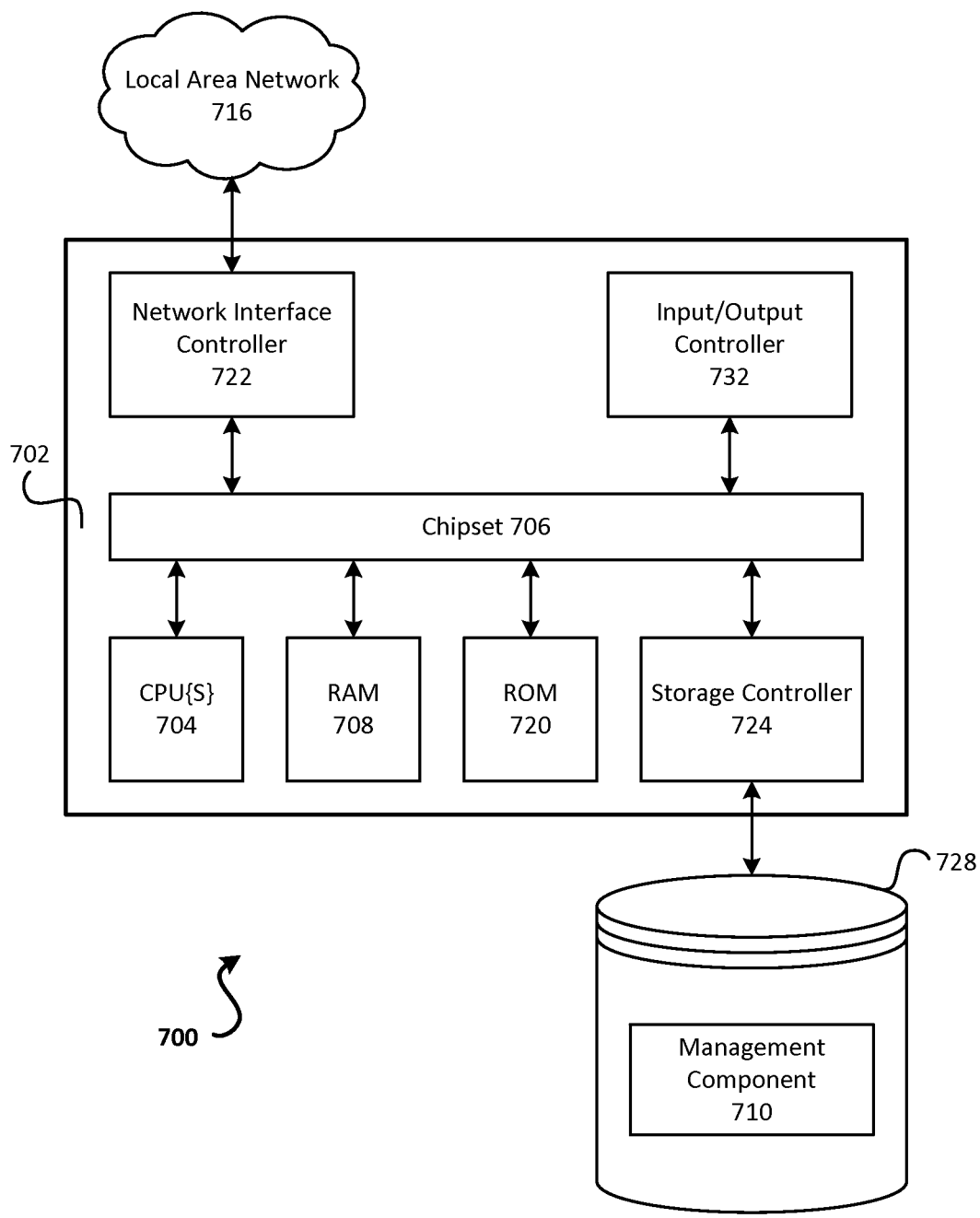
FIG. 7 depicts an example computer architecture for a computer capable of executing the above-described software components.

FIGS. 5-7 are similar to FIG. 1 in that they depict example operating environments in which embodiments disclosed herein may be implemented, and these figures depict these operating environments at varying levels of granularity. FIG. 5 generally depicts a web services platform that comprises a plurality of datacenters. FIG. 6 generally depicts a datacenter that comprises a plurality of computers. FIG. 7 generally depicts a computer that may be part of a datacenter.

It may be appreciated that these operating environments of FIGS. 5-7 may be used to implement aspects of the operating environment of FIG. 1. For example, load balancer 106, host computer 110, and anomaly detector 116 may be implemented in a datacenter 502 of FIG. 5, or across multiple datacenters 502 of FIG. 5. Likewise, Internet 104 of FIG. 1 may be wide area network 506 of FIG. 5, and customer computer-A 102A and customer computer-B 102B each may be customer computing system 504 of FIG. 5.

Turning now to details of FIG. 5, that figure depicts an example of a suitable computing environment in which embodiments described herein may be implemented. A cloud service provider (such as web services platform 508) may configure the illustrated computing environment to host virtual clouds of entities and to enable communication paths between these virtual clouds that may otherwise be isolated. In particular, FIG. 5 is a system and network diagram that shows an illustrative operating environment 500 that includes a web services platform 508, for implementing virtual clouds and for providing on-demand access to compute resources, such as virtual machine instances. Web services platform 508 can provide compute resources for executing applications on a permanent or an as-needed basis and may be configured as a private network. These compute resources may include various types of resources, such as data processing resources, data storage resources, data communication resources and the like. Each type of compute resource may be general-purpose or may be available in a number of specific configurations. For example, data processing resources may be available as virtual machine instances. The instances may be configured to execute applications, including Web servers, application servers, media servers, database servers and the like. Data storage resources may include file storage devices, block storage devices and the like.

Each type or configuration of compute resource may be available in different sizes, such as large resources consisting of many processors, large amounts of memory and/or large storage capacity and small resources consisting of fewer processors, smaller amounts of memory and/or smaller storage capacity. Entities may choose to allocate a number of small processing resources as web servers and/or one large processing resource as a database server, for example.

The compute resources provided by web services platform 508 may be enabled by one or more datacenters 502A-502N, which may be referred herein singularly as "datacenter 502" or in the plural as "datacenters 502." Datacenters 502 may be facilities that house and operate computer systems and associated components and may include redundant and backup power, communications, cooling and security systems. Datacenters 502 may be located in a same geographical area, such as in a same facility, and may be interconnected using private networks, such as high-speed fiber optic networks, controlled and managed by a service provider of web services platform 508. Datacenters 502 may also be distributed across geographically disparate locations and may be interconnected in part using public networks, such as the Internet. One illustrative configuration for datacenter 502 that implements the concepts and technologies disclosed herein is described below with regard to FIG. 6.

Entities of web services platform 508 may access the compute resources provided by datacenters 502 over a wide-area network ("WAN") 506. Although a WAN is illustrated in FIG. 5, it should be appreciated that a local-area network ("LAN"), the Internet or any other networking topology known in the art that connects datacenters 502 to remote entities and other users may be utilized. It should also be appreciated that combinations of such networks may also be utilized.

An entity or other entities that are customers of web services platform 508 may utilize a computing system 504 to access the compute resources provided by datacenters 502. Customer computing system 504 comprises a computer capable of accessing web services platform 508, such as a server computer, a desktop or laptop personal computer, a tablet computer, a wireless telephone, a PDA, an e-reader, a game console, a set-top box or any other computing node.

As is described in greater detail below, customer computing system 504 may be utilized to configure aspects of the compute resources provided by web services platform 508. In this regard, web services platform 508 may provide a web interface through which aspects of its operation may be configured through the use of a web browser application program executing on customer computing system 504. Alternatively, a stand-alone application program executing on customer computing system 504 may access an application programming interface ("API") exposed by web services platform 508 for performing the configuration operations. Other mechanisms for configuring the operation of web services platform 508, including launching new virtual machine instances on web services platform 508, may also be utilized.

According to embodiments disclosed herein, capacities of purchased compute resources provided by web services platform 508 can be scaled in response to demand. In this regard, scaling refers to the process of instantiating, which may also be referred to herein as "launching" or "creating," or terminating, which may also be referred to herein as "de-scaling," instances of compute resources in response to demand.

Web services platform 508 may also be configured with a deployment component to assist entities in the deployment of new instances of compute resources. The deployment component may receive a configuration from an entity that may include data describing how new instances should be configured. For example, the configuration may specify one or more applications or software components that should be installed in new instances, provide scripts and/or other types of code to be executed in new instances, provide cache warming logic specifying how an application cache should be prepared and other types of information. The deployment component utilizes the entity-provided configuration and cache warming logic to launch, configure and prime new instances of compute resources.

FIG. 6 depicts a computing system diagram that illustrates one configuration for datacenter 502 that implements web services platform 508. With regards to elements of the web services platform previously described with respect to FIG. 1, host computer 110 may be a server computer 602 of FIG. 6 (which itself may be computer 700 of FIG. 7), host partition 112 may be an instance of instance manager 608 (where a host partition serves a hypervisor-type role), and VM instances 114A and 114B may each be an instance 606 of FIG. 6. Network infrastructure 108 of FIG. 1 may be local area network 616 of FIG. 6, and anomaly detector 116 of FIG. 1 may be server computer 604 of FIG. 6.

The example datacenter 502 shown in FIG. 6 may include several server computers 602A-602N, which may be referred herein singularly as "server computer 602" or in the plural as "server computers 602," for providing compute resources for hosting virtual clouds and for executing applications. Server computers 602 may be standard tower or rack-mount server computers configured appropriately for providing the compute resources described above. For instance, in one implementation server computers 602 may be configured to provide instances 606A-606N of compute resources.

Instances 606A-606N, which may be referred herein singularly as "instance 606" or in the plural as "instances 606," may be virtual machine instances. As known in the art, a virtual machine instance is an instance of a software implementation of a machine (i.e., a computer) that executes programs like a physical machine. In the example of virtual machine instances, each server 602 may be configured to execute an instance manager 608 capable of executing the instances. Instance manager 608 may be a hypervisor or another type of program configured to enable the execution of multiple instances 606 on a single server 602, for example. As discussed above, each of instances 606 may be configured to execute all or a portion of an application.

It should be appreciated that although the embodiments disclosed herein are described primarily in the context of virtual machine instances, other types of instances can be utilized with the concepts and technologies disclosed herein. For instance, the technologies disclosed herein may be utilized with instances of storage resources, instances of data communications resources and with other types of resources. The embodiments disclosed herein may also execute all or a portion of an application directly on a computer system without utilizing virtual machine instances.

Datacenter 502 shown in FIG. 6 may also include a server computer 604 reserved for executing software components for managing the operation of datacenter 502, server computers 602 and instances 606. In particular, server computer 604 may execute a management component 610. As discussed above, working between FIG. 5. and FIG. 6, an entity of web services platform 508 may utilize customer computing system 504 to access management component 610 to configure various aspects of the operation of web services platform 508 and instances 606 purchased by the entity. For example, the entity may purchase instances and make changes to the configuration of the instances. The entity may also specify settings regarding how the purchased instances are to be scaled in response to demand. The entity may also provide requests to launch instances to management component 610.

As also described briefly above, an auto scaling component 612 may scale instances 606 based upon rules defined by an entity of web services platform 508. For example, auto scaling component 612 may allow an entity to specify scale up rules for use in determining when new instances should be instantiated and scale down rules for use in determining when existing instances should be terminated.

As discussed briefly above, datacenter 502 may also be configured with a deployment component 614 to assist entities in the deployment of new instances 606 of compute resources. Deployment component 614 may receive a configuration from an entity that includes data describing how new instances 606 should be configured. For example, the configuration may specify one or more applications that should be installed in new instances 606, provide scripts and/or other types of code to be executed for configuring new instances 606, provide cache warming logic specifying how an application cache should be prepared and other types of information.

Deployment component 614 may utilize the entity-provided configuration and cache warming logic to configure, prime and launch new instances 606. The configuration, cache warming logic and other information may be specified by an entity using management component 610 or by providing this information directly to deployment component 614. Other mechanisms may also be utilized to configure the operation of deployment component 614.

In the example datacenter 502 shown in FIG. 6, an appropriate LAN (local area network) 616 may be utilized to interconnect server computers 602A-602N and server computer 604. LAN 616 may also be connected to WAN 506 illustrated in FIG. 5. It should be appreciated that the network topology illustrated in FIGS. 5 and 6 has been greatly simplified and that many more networks and networking devices may be utilized to interconnect the various computing systems disclosed herein. Appropriate load balancing devices or software modules may also be utilized for balancing a load between each of datacenters 502A-502N, between each of server computers 602A-602N in each datacenter 502 and between instances 606 purchased by each entity of web services platform 508. These network topologies and devices should be apparent to those skilled in the art.

It should be appreciated that datacenter 502 described in FIG. 6 is merely illustrative and that other implementations may be utilized. In particular, functionality described herein as being performed by management component 610, auto scaling component 612 and deployment component 614 may be performed by one another, may be performed by other components or may be performed by a combination of these or other components. Additionally, it should be appreciated that this functionality may be implemented in software, hardware or a combination of software and hardware. Other implementations should be apparent to those skilled in the art.

FIG. 7 depicts an example computer architecture for a computer 700 capable of executing the above-described software components. With regard to the example web services platform described with respect to FIG. 1, host computer 110 and anomaly detector 116, as well as customer computer-A 102A, and customer computer-B 102B may each be implemented in computer 700 of FIG. 7.

The computer architecture shown in FIG. 7 illustrates a conventional server computer, workstation, desktop computer, laptop, tablet, network appliance, PDA, e-reader, digital cellular phone or other computing node, and may be utilized to execute any aspects of the software components presented herein described as executing within datacenters 502A-502N, on server computers 602A-602N, on the customer computing system 504 or on any other computing system mentioned herein.

Computer 700 may include a baseboard, or "motherboard," which is a printed circuit board to which a multitude of components or devices may be connected by way of a system bus or other electrical communication paths. One or more central processing units ("CPUs") 704 may operate in conjunction with a chipset 706. CPUs 704 may be standard programmable processors that perform arithmetic and logical operations necessary for the operation of computer 700.

CPUs 704 may perform the necessary operations by transitioning from one discrete physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits including registers, adders-subtractors, arithmetic logic units, floating-point units and the like.

Chipset 706 may provide an interface between CPUs 704 and the remainder of the components and devices on the baseboard. Chipset 706 may provide an interface to a random access memory ("RAM") 708 used as the main memory in computer 700. Chipset 706 may further provide an interface to a computer-readable storage medium such as a read-only memory ("ROM") 720 or non-volatile RAM ("NVRAM") for storing basic routines that may help to start up computer 700 and to transfer information between the various components and devices. ROM 720 or NVRAM may also store other software components necessary for the operation of computer 700 in accordance with the embodiments described herein.

Computer 700 may operate in a networked environment using logical connections to remote computing nodes and computer systems through network 616. Chipset 706 may include functionality for providing network connectivity through a network interface controller ("NIC") 722, such as a gigabit Ethernet adapter. NIC 722 may be capable of connecting the computer 700 to other computing nodes over network 616. It should be appreciated that multiple NICs 722 may be present in computer 700, connecting the computer to other types of networks and remote computer systems.

Computer 700 may be connected to a mass storage device 728 that provides non-volatile storage for the computer. Mass storage device 728 may store system programs, application programs, other program modules and data which have been described in greater detail herein. Mass storage device 728 may be connected to computer 700 through a storage controller 724 connected to chipset 706. Mass storage device 728 may consist of one or more physical storage units. Storage controller 724 may interface with the physical storage units through a serial attached SCSI ("SAS") interface, a serial advanced technology attachment ("SATA") interface, a fiber channel ("FC") interface or other type of interface for physically connecting and transferring data between computers and physical storage units.

Computer 700 may store data on mass storage device 728 by transforming the physical state of the physical storage units to reflect the information being stored. The specific transformation of a physical state may depend on various factors and on different implementations of this description. Examples of such factors may include, but are not limited to, the technology used to implement the physical storage units and whether mass storage device 728 is characterized as primary or secondary storage and the like.

For example, computer 700 may store information to mass storage device 728 by issuing instructions through storage controller 724 to alter the magnetic characteristics of a particular location within a magnetic disk drive unit, the reflective or refractive characteristics of a particular location in an optical storage unit or the electrical characteristics of a particular capacitor, transistor or other discrete component in a solid-state storage unit. Other transformations of physical media are possible without departing from the scope and spirit of the present description, with the foregoing examples provided only to facilitate this description. Computer 700 may further read information from mass storage device 728 by detecting the physical states or characteristics of one or more particular locations within the physical storage units.

In addition to mass storage device 728 described above, computer 700 may have access to other computer-readable storage media to store and retrieve information, such as program modules, data structures or other data. It should be appreciated by those skilled in the art that computer-readable storage media can be any available media that provides for the storage of non-transitory data and that may be accessed by computer 700.

By way of example and not limitation, computer-readable storage media may include volatile and non-volatile, transitory computer-readable storage media and non-transitory computer-readable storage media, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY or other optical storage, magnetic cassettes, magnetic tape, magnetic disk storage, other magnetic storage devices or any other medium that can be used to store the desired information in a non-transitory fashion.

Mass storage device 728 may store an operating system utilized to control the operation of the computer 700. According to one embodiment, the operating system comprises a version of the LINUX operating system. According to another embodiment, the operating system comprises a version of the WINDOWS SERVER operating system from the MICROSOFT Corporation. According to further embodiments, the operating system may comprise a version of the UNIX operating system. It should be appreciated that other operating systems may also be utilized. Mass storage device 728 may store other system or application programs and data utilized by computer 700, such as management component 610 and/or the other software components described above.

Mass storage device 728 or other computer-readable storage media may also be encoded with computer-executable instructions, which, when loaded into computer 700, transforms the computer from a general-purpose computing system into a special-purpose computer capable of implementing the embodiments described herein. These computer-executable instructions transform computer 700 by specifying how CPUs 704 transition between states, as described above. Computer 700 may have access to computer-readable storage media storing computer-executable instructions, which, when executed by computer 700, may perform operating procedures depicted in FIGS. 2-4.

Computer 700 may also include an input/output controller 732 for receiving and processing input from a number of input devices, such as a keyboard, a mouse, a touchpad, a touch screen, an electronic stylus or other type of input device. Similarly, input/output controller 732 may provide output to a display, such as a computer monitor, a flat-panel display, a digital projector, a printer, a plotter or other type of output device. It will be appreciated that computer 700 may not include all of the components shown in FIG. 7, may include other components that are not explicitly shown in FIG. 7 or may utilize an architecture completely different than that shown in FIG. 7.

As described herein, a computing node may be a physical computing node, such as computer 700 of FIG. 7. A computing node may also be a virtual computing node, such as a virtual machine instance, or a session hosted by a physical computing node, where the computing node is configured to host one or more sessions concurrently.

It should be appreciated that the network topologies illustrated in the figures have been greatly simplified and that many more networks and networking devices may be utilized to interconnect the various computing systems disclosed herein. These network topologies and devices should be apparent to those skilled in the art.

It should also be appreciated that the systems in the figures are merely illustrative and that other implementations might be used. Additionally, it should be appreciated that the functionality disclosed herein might be implemented in software, hardware or a combination of software and hardware. Other implementations should be apparent to those skilled in the art. It should also be appreciated that a server, gateway or other computing node may comprise any combination of hardware or software that can interact and perform the described types of functionality, including without limitation desktop or other computers, database servers, network storage devices and other network devices, PDAs, tablets, cellphones, wireless phones, pagers, electronic organizers, Internet appliances, television-based systems (e.g., using set top boxes and/or personal/digital video recorders) and various other consumer products that include appropriate communication capabilities. In addition, the functionality provided by the illustrated modules may in some embodiments be combined in fewer modules or distributed in additional modules. Similarly, in some embodiments the functionality of some of the illustrated modules may not be provided and/or other additional functionality may be available.

Each of the operations, processes, methods and algorithms described in the preceding sections may be embodied in, and fully or partially automated by, code modules executed by one or more computers or computer processors. The code modules may be stored on any type of non-transitory computer-readable medium or computer storage device, such as hard drives, solid state memory, optical disc and/or the like. The processes and algorithms may be implemented partially or wholly in application-specific circuitry. The results of the disclosed processes and process steps may be stored, persistently or otherwise, in any type of non-transitory computer storage such as, e.g., volatile or non-volatile storage.

The various features and processes described above may be used independently of one another, or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel or in some other manner. Blocks or states may be added to or removed from the disclosed example embodiments. The example systems and components described herein may be configured differently than described. For example, elements may be added to, removed from or rearranged compared to the disclosed example embodiments.

It will also be appreciated that various items are illustrated as being stored in memory or on storage while being used, and that these items or portions thereof may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a computer-readable medium, such as a hard disk, a memory, a network or a portable media article to be read by an appropriate drive or via an appropriate connection. The systems, modules and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

Conditional language used herein, such as, among others, "can," "could," "might," "may," "e.g." and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having" and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some or all of the elements in the list.

While certain example embodiments have been described, these embodiments have been presented by way of example only, and are not intended to limit the scope of the inventions disclosed herein. Thus, nothing in the foregoing description is intended to imply that any particular feature, characteristic, step, module or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

What is claimed is:

1. A computer-implemented method for determining how a comparison computing node or process is in an anomalous condition relative to a baseline computing node or process that is determined to be in a non-anomalous condition, comprising:
    determining a first difference between a value of a first metric of a plurality of metrics for the baseline computing node or process over a baseline time period and a value of a first metric of the plurality of metrics for the comparison computing node or process over a comparison time period, based at least in part on a first statistical measure;
    determining a second difference between a value of a second metric of the plurality of metrics for the baseline computing node or process over the baseline time period and a value of a second metric of the plurality of metrics for the comparison computing node or process over the comparison time period, based at least in part on a second statistical measure;
    producing a weighted result based at least in part on weighting the first difference and weighting the second difference;
    determining at least one metric among the plurality of metrics as being likely to identify a possible cause of the comparison computing node or process to be in the anomalous condition based on the weighted result; and
    generating an identification of the at least one metric for taking remedial action based on the at least one metric.

2. The method of claim 1, further comprising:
    receiving an indication from a user of how useful the at least one metric was in identifying the possible cause of the comparison computing node or process to be in the anomalous condition;
    determining a second weighted result used to determine how a second comparison computing node or process is in an anomalous condition based at least in part on the indication from the user; and
    determining a second metric likely to identify a possible cause of the second comparison computing node or process to be in the anomalous condition based on the second weighted result.

3. A system, comprising:
    a memory bearing instructions that, upon execution by a processor, cause the system at least to:
        determine a first difference between first values of a plurality of metrics for a first computing node or process over a first time period and second values of the plurality of metrics for a second computing node or process over a second time period, based at least in part on a first statistical measure;
        determine a second difference between the first values of the plurality of metrics for the first computing node or process over the first time period and the second values of the plurality of metrics for the second computing node or process over the second time period, based at least in part on a second statistical measure;
        produce a weighted result based at least in part on weighting the first difference and weighting the second difference;
        determine at least one metric among the plurality of metrics as being likely to identify a possible cause of the second computing node or process to be in an anomalous condition based on the weighted result; and store an identification of the at least one metric in a memory location.

4. The system of claim 3, wherein the memory further bears instructions that, when executed upon the processor, cause the system at least to:
receive an indication from a user of how useful the at least one metric was in identifying the possible cause of the second computing node or process to be in the anomalous condition; and
determine a second weighted result used to determine how a second comparison computing node or process is in an anomalous condition based at least in part on the indication from the user.

5. The system of claim 4, wherein the memory further bears instructions that, when executed upon the processor, cause the system at least to:
determine a second metric likely to identify a possible cause of the second comparison computing node or process to be in the anomalous condition based on the second weighted result.

6. The system of claim 4, wherein the memory further bears instructions that, when executed upon the processor, cause the system at least to:
receive an indication from the user of a context of the second computing node or process; and
determine the second weighted result based at least in part on the context of the second computing node or process.

7. The system of claim 3, wherein the first computing node or process and the second computing node or process share a hardware type, an operating system type, or a software type.

8. The system of claim 3, wherein the first time period and the second time period run for a same amount of time.

9. The system of claim 3, wherein the first time period and the second time period occur at a same time of a day, on a same day of a week, or on a same day of a month.

10. The system of claim 3, wherein the first statistical measure comprises a magnitude of difference of the first values and the second values.

11. The system of claim 3, wherein the first statistical measure comprises a variance of the first values and the second values.

12. The system of claim 3, wherein the first statistical measure comprises an order of events of the plurality of metrics.

13. The system of claim 12, wherein the memory further bears instructions that, when executed upon the processor, cause the system at least to:
determine the order of events based on a log file identifying metrics of the plurality of metrics with corresponding time stamps.

14. The system of claim 3, wherein the first statistical measure comprises comparing the first values and the second values, wherein the plurality of metrics are specific to an application that is executed by each of the first computing node or process and the second computing node or process.

15. The system of claim 3, wherein the memory further bears instructions that, when executed upon the processor, cause the system at least to:
determine the first time period based on analyzing historical information about the first computing node, the first time period sharing a characteristic with the second time period.

16. The system of claim 3, wherein the memory further bears instructions that, when executed upon the processor, cause the system at least to:
determine a starting time of the second time period based at least in part on the occurrence of an event, alarm, or reported problem.

17. A non-transitory computer-readable medium bearing computer-executable instructions that, when executed, cause the performance of operations comprising:
determining a first difference between a value of a first metric of a plurality of metrics for a first computing node or process and a value of the first metric of the plurality of metrics for a second computing node or process, based at least in part on a first statistical measure;
determining a second difference between a value of a second metric of the plurality of metrics for the first computing node or process and a value of the second metric the plurality of metrics for the second computing node or process, based at least in part on a second statistical measure;
producing a weighted result based at least in part on weighting the first difference and weighting the second difference;
determining at least one metric among the plurality of metrics as being likely to identify a possible cause of the second computing node or process when in an anomalous condition based on the weighted result; and
storing an identification of the at least one metric in a memory location.

18. The non-transitory computer-readable medium of claim 17, further bearing computer-executable instructions that, when executed, cause the performance of operations comprising:
receiving an indication from a user of how useful the at least one metric was in identifying the possible cause of the second computing node or process to be in the anomalous condition; and
modifying the weighting of the result of the first statistical measure and the result of the second statistical measure to produce a modified weighting.

19. The non-transitory computer-readable medium of claim 18, further bearing computer-executable instructions that, when executed, cause the performance of operations comprising:
using the modified weighting to determine a second metric likely to identify a possible cause of a third computing node or process to be in an anomalous condition.

20. The non-transitory computer-readable medium of claim 17, wherein the first computing node or process and the second computing node or process are a same computing node or process.

21. The non-transitory computer-readable medium of claim 17, wherein the at least one metric comprises a subset of the plurality of metrics.

22. The non-transitory computer-readable medium of claim 17, wherein the at least one metric comprises central processing unit (CPU) utilization, a measure of disk utilization, a measure of network utilization, a hypertext transfer protocol (HTTP) status code, a latency to complete an operation, an amount of resource utilization, an error or success rate of the operation, a result or status code from the operation, or a number of operations attempted or completed within a time period.

23. The non-transitory computer-readable medium of claim 17, further bearing computer-executable instructions that, when executed, cause the performance of operations comprising:

continuously comparing the first values of the plurality of metrics for the first computing node or process and the second values of the plurality of metrics for the second computing node or process as they may vary over time;

determining a deviation between the first values of the plurality of metrics for the first computing node or process and the second values of the plurality of metrics for the second computing node or process as they may vary over time; and storing an indication of the deviation in a second memory location.

24. The non-transitory computer-readable medium of claim 17, further bearing computer-executable instructions that, when executed, cause the performance of operations comprising:

determining a third difference between third values of the plurality of metrics for a third computing node or process and fourth values of the plurality of metrics for a fourth computing node or process, based at least in part on the first statistical measure, the fourth computing node or process performing a different function than the second computing node or process, the fourth computing node or process and the second computing node or process being part of a same system;

determining a fourth difference between the third values of the plurality of metrics for the third computing node or process and the fourth values of the plurality of metrics for the fourth computing node or process, based at least in part on the second statistical measure;

producing a second weighted result based at least in part on weighting the third difference and the fourth difference; and determining that the second computing node or process is more likely to be in an anomalous condition than the fourth computing node or process based at least in part on a comparison of the weighted result and the second weighted result.

* * * * *